(12) United States Patent
Krishnamoorthy et al.

(10) Patent No.: US 8,103,656 B2
(45) Date of Patent: Jan. 24, 2012

(54) INTEGRATED DISTRIBUTED QUERY PROCESSOR FOR DATA GRIDS

(75) Inventors: Srikumar Krishnamoorthy, Chennai (IN); Avdhoot Kishore Saple, Mumbai (IN); Prahalad Haldhoderi Achutharao, Bangalore (IN)

(73) Assignee: Infosys Technologies Limited (IN)

( * ) Notice: Subject to any disclaimer, the term of this patent is extended or adjusted under 35 U.S.C. 154(b) by 163 days.

(21) Appl. No.: 12/389,473

(22) Filed: Feb. 20, 2009

(65) Prior Publication Data

US 2009/0281987 A1 Nov. 12, 2009

(30) Foreign Application Priority Data

Feb. 20, 2008 (IN) .............................. 429/CHE/2008

(51) Int. Cl.
*G06F 7/00* (2006.01)
(52) U.S. Cl. ...................................................... 707/713
(58) Field of Classification Search .................... None
See application file for complete search history.

(56) References Cited

U.S. PATENT DOCUMENTS

| | | | |
|---|---|---|---|
| 7,444,337 B2* | 10/2008 | Zhou et al. ............................. | 1/1 |
| 7,624,007 B2* | 11/2009 | Bennett ............................. | 704/9 |
| 2003/0208484 A1* | 11/2003 | Chang et al. ...................... | 707/5 |
| 2005/0071331 A1* | 3/2005 | Gao et al. ........................... | 707/4 |
| 2006/0106894 A1* | 5/2006 | Richardson ................... | 707/204 |
| 2006/0288030 A1* | 12/2006 | Lawrence ..................... | 707/101 |
| 2007/0050328 A1* | 3/2007 | Li et al. .............................. | 707/2 |
| 2007/0061487 A1* | 3/2007 | Moore et al. ................... | 709/246 |
| 2008/0086469 A1* | 4/2008 | Gu et al. ............................ | 707/6 |
| 2009/0132611 A1* | 5/2009 | Brown et al. ................. | 707/203 |

OTHER PUBLICATIONS

Bin Cheng, Lex Stein, Hai Jin, Zheng Zhang, A Framework for Lazy Replication in P2P VoD Jun. 5, 2008 p. 93-98.*
Yuri Breitbart, Fine-Grained Lazy Replication with Strict Freshness and Correctness Guarantees, Sep. 2004.*
Barbara Liskov, Lazy Replication: Exploiting the semantics of Distribute Services, 1990.*

* cited by examiner

*Primary Examiner* — Apu Mofiz
*Assistant Examiner* — Thu Nga Nguyen
(74) *Attorney, Agent, or Firm* — Lerner, David, Littenberg, Krumholz & Mentlik, LLP (57) ABSTRACT

A method for processing a distributed query in a network of computational resources is provided. The method includes receiving a user-defined freshness criterion and a distributed query from a user. The user-defined data freshness criterion is based on the version of the distributed query results desired by the user. An integrated cost model is formulated to optimize the execution of the distributed query. The integrated cost model is based on one or more integrated cost model factors. Thereafter, an objective function is constructed, based on the processing cost for each of the one or more copies of the one or more relations, and a data transmission cost for the transfer of the one or more copies of the one or more relations from a first to a second computational resource. Subsequently, an optimal solution of the objective function is calculated by using one or more heuristic approaches.

14 Claims, 7 Drawing Sheets

INTEGRATED DISTRIBUTED QUERY PROCESSOR FOR DATA GRIDS

BACKGROUND OF THE INVENTION

The invention relates generally to the field of query processing in a network of computational resources. More specifically, the invention relates to a method and a computer program product for formulating an integrated cost model to optimize the execution of the distributed query in a network of computational resources.

Data in an enterprise is stored in one or more heterogeneous formats at geographically separate locations. The disparate and geographically separate data sources in an enterprise can be integrated by using distributed computing technologies such as data grids. These technologies enable seamless integration of data sources. The integration is achieved through design and development of a distributed query engine.

Numerous approaches have been proposed that either reduce the communication cost or the response time. Some of the approaches that minimize communication cost implement the concept of 'semi-joins' to reduce the amount of data transferred to remote nodes during a join operation. The cost and benefit of semi-joins is estimated in between two relations referenced in the query and recursively the most profitable join is selected for query processing. Further, approaches that minimize response times utilize parallel processing techniques to achieve enhanced query optimization.

In the approaches that aim to reduce communication costs and response times, query evaluation is performed in three distinct phases. These phases include creation of a single-node plan, generation of parallel plan and site selection for plan execution. In the first phase, conventional query optimization plan is employed to determine the optimal single-node query plan. Subsequently, in the second phase, the single-node plan is split into parallel plans by introducing exchange operators in the single-node plan. The generated parallel plans are then allocated to different machines for execution. In the last phase, optimal query scheduling techniques are employed to minimize the communication cost and thereby improve query evaluation performance.

However, such approaches optimize the query in a distinct, independent and isolated manner. Moreover, since the three phases are considered in isolation, it results in sub-optimal plans. During the first phase, an optimal single-node plan is created without considering the node-level parameters, such as available memory, processing speed, and other resource-scheduling parameters. Therefore, the optimal plan generated in the first phase may be an inefficient query plan. Further, there is a lack of an integrated query processing method that considers the node-level and resource-scheduling parameters in all the three phases of query optimization. The challenge, however, lies in developing a distributed query processing engine, which can generate an optimal query execution plan to reduce query response times.

In light of the foregoing, there is a need for an integrated distribution query optimization model that includes node-level and database-related parameters. Moreover, there is a need for an integrated distribution query optimization model for an enhanced query response time.

BRIEF SUMMARY OF THE INVENTION

An object of the invention is to provide a method and a computer program product for processing a distributed query in a network of a plurality of computational resources.

Another object of the invention is to provide a method for formulating an integrated cost model to optimize the execution of the distributed query.

Yet another object of the invention is to provide a method for determining an optimal solution for the query.

To achieve the objectives mentioned above, the invention provides a method and a computer program product for processing a distributed query in a network of computational resources. These computational resources host zero or more relations that belong to one or more databases. These relations are replicated by using a 'lazy replication' technique known in the art to form copies of the relations. The method includes receiving a user-defined freshness criterion and a distributed query from a user. The user-defined data freshness criterion is based on the 'version' of the distributed query results desired by the user. Thereafter, an integrated cost model is formulated to optimize the execution of the distributed query. The integrated cost model is based on one or more factors of the integrated cost model. These factors include the user-defined data freshness criterion, an information freshness measure of the relations that is based on the version of the copies of the relations, the computational resources hosting zero or more relations, and the one or more computational-resource parameters, such as available memory and processing speed of each computational resource. Further, the integrated cost model is based on one or more database-related parameters, such as one or more index access paths, one or more join algorithm types, size of one or more copies of the one or more relations, and selectivity of one or more local and join predicates. Furthermore, the integrated cost model is based on one or more cost parameters, such as communication cost for a link between a first and a second computational resource.

Thereafter, an objective function is constructed, based on the processing cost for each of the one or more copies of the one or more relations, and a data transmission cost for the transfer of the one or more copies of the one or more relations from the first to the second computational resource. Subsequently, an optimal solution of the objective function is calculated by using one or more heuristic approaches, which include parallel plan construction heuristics and computational node heuristics.

The invention described above provides an integrated cost model that includes computational resource parameters along with database related parameters. The computational resource parameters help in identifying the computational resources that are used for query evaluation. Further, the invention provides query execution results, based on a user-defined freshness criterion. This criterion helps to provide the version of the distributed query results desired by the user and enables the realization of the enhanced query response time. Moreover, the integrated cost model provides an enhanced query response time by using the computational resources that do not host relations.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION OF DRAWINGS

The invention provides a method for processing a distributed query in a network of a plurality of computational resources. At least one of the plurality of computational resources hosts one or more relations referenced in a query. These one or more relations belong to one or more databases. These relations have been replicated by using a lazy replication technique that is known in the art to form one or more copies of the one or more relations. Thereafter, an integrated cost model is formulated, based on one or more integrated cost model factors, which include a user-defined freshness criterion. This user-defined criterion is based on the version of the distributed query processing results that are desired by a user. Subsequently, an optimal solution of the objective function is calculated by using one or more heuristic approaches.

Figure 1:
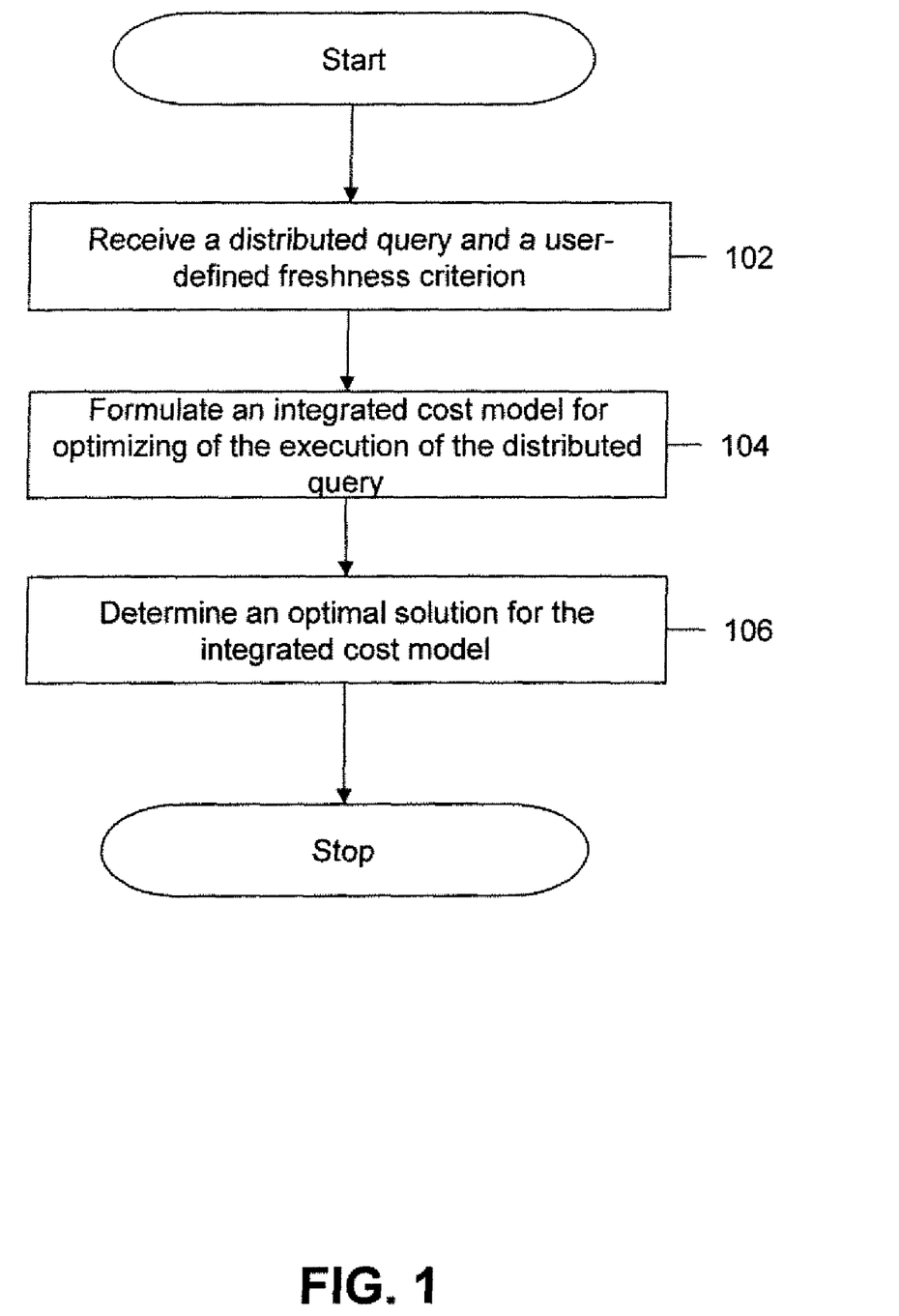
FIG. 1 is a flowchart illustrating a method for processing a distributed query in a network of a plurality of computational resources, in accordance with an embodiment of the invention.

FIG. 1 is a flowchart illustrating a method for processing a distributed query in a network of a plurality of computational resources, in accordance with an embodiment of the invention. At step 102, a distributed query and a user-defined freshness criterion DF are received from a user. The user-defined freshness criterion DF is based on the version of the distributed query processing results that are desired by the user. In an embodiment of the invention, the user-defined freshness criterion DF is denoted by a range of values between 0 and 1, where 1 indicates the requirement of real-time data in the distributed query processing results, and 0 indicates the requirement of the old version of data in the distributed query processing results. The user-defined freshness criterion DF is used as a variation factor in the calculation of processing cost of a relation at a computational resource. The calculation of processing cost, based on the freshness criterion DF is described in detail in conjunction with FIG. 2.

After receiving the freshness criterion DF at step 104, an integrated cost model is formulated to optimize the execution of the distributed query. The formulation is based on one or more integrated cost model factors. These factors include the user-defined data freshness criterion, an information freshness measure of one or more relations referenced in the distributed query, and the plurality of computational resources. The details of the formulation of the integrated cost model, based on the various integrated cost model factors are described in detail in conjunction with FIG. 2.

Subsequently, at step 106, an optimal solution of the integrated cost model is generated, based on one or more heuristic approaches. The details of the optimal solution of the integrated cost model are described in conjunction with FIGS. 3, 4a, 4b and 4c.

Figure 2:
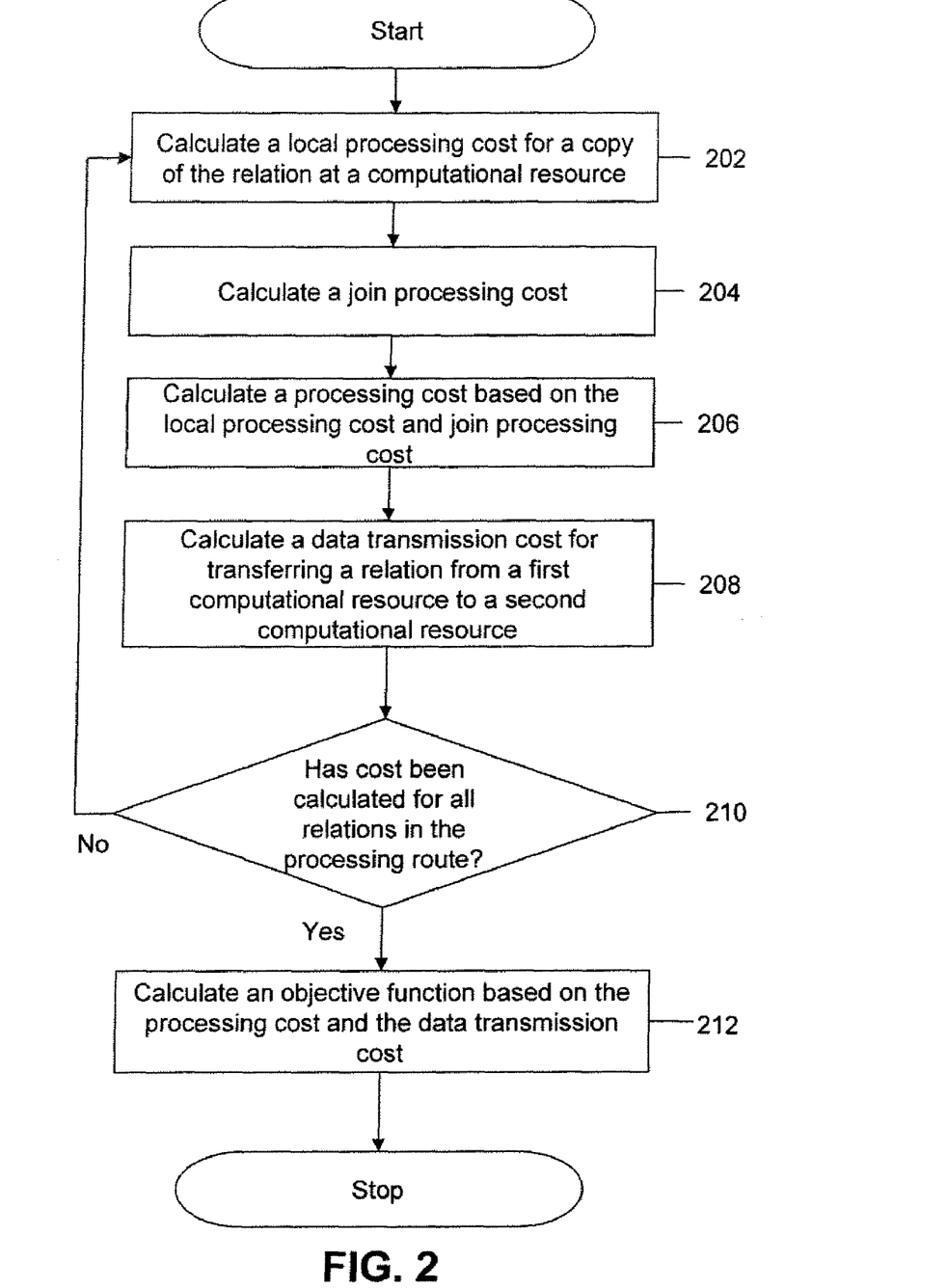
FIG. 2 is a flowchart illustrating a method for formulating an integrated cost model to optimize the execution of the distributed query, in accordance with an embodiment of the invention.

FIG. 2 is a flowchart illustrating a method for formulating an integrated cost model to optimize the execution of the distributed query, in accordance with an embodiment of the invention.

In this embodiment of the invention, a distributed query of the form query Q is received from the user. An exemplary query Q is of the form $Q=\{R_1.a, R_4.c | R_1.a=R_2.a^{\wedge}R_2.b=R_3.b^{\wedge}R_3.c=R_4.c\}$. The query Q involves four relations $R_1$, $R_2$, $R_3$, and $R_4$ for the selection of attribute a of $R_1$ and attribute c of $R_4$, such that attribute a of $R_1$ is equal to attribute a of $R_2$, attribute b of $R_2$ is equal to attribute b of $R_3$, and attribute c of $R_3$ is equal to attribute c of $R_4$. An integrated cost model is formulated to represent the cost associated with the execution of the query Q.

In this embodiment of the invention, a computational resource J, amongst the plurality of the computational resources M, hosts at least one copy of a relation R referenced in the query Q. Further, the computational resource J maintains a plurality of access paths, $AP_{JRA}$, for each of the attributes A of the relation R.

Each copy of the relation R has a defined freshness index, which is calculated as:

$$CF_R=[1-(X/MaxUpdateFrequency)] \qquad (1)$$

where MaxUpdateFrequency is a pre-defined maximum frequency of update among the one or more copies of the relation R, and X is the current update frequency of a copy of the relation R. The update frequency for the copy is measured as the difference of the current time and the last update time. For example, if the relation R has four copies, namely, $C_{R1}$, $C_{R2}$, $C_{R3}$, and $C_{R4}$, that are being updated at 0 hours, 12 hours, 24 hours, and 48 hours, respectively; the freshness indices for the four copies are computed as $CF_R$=(1.00, 0.75, 0.50 and 0.00), in accordance with equation (1).

Further, the freshness index is used to calculate the information freshness measure. The information freshness is used to calculate the processing cost of a relation R at a computational resource. In an embodiment of the present invention, the information freshness measure can be defined as:

$$IF_J=\Sigma(w_J \times CF_{RJ}) \qquad (2)$$

where $CF_{RJ}$ is the freshness index of a copy of the relation R on the computational resource J that is calculated in accordance with equation (1), and $w_J$ is the weight of the copy of the relation R.

A directed acyclic graph is constructed for the query Q in which one or more relations is referenced. The directed acyclic graph includes the relations to be joined, and the computational resources M containing the relations. The directed acyclic graph is constructed, in accordance with the following function:

$$G=(V,E) \qquad (3)$$

where V are the computational resources, also referred to as vertices, and E is an edge or arc connecting the vertices $(u,v) \in V$.

The directed acyclic graph is constructed, according to the following rules:

(a) the vertices V={VR}U{MNR}, where VR=[Diagonal (R)×CR×Diagonal (M)]; Diagonal (R) is a diagonal matrix of size K×K with diagonal elements (r, r) filled with $R_r$ and other elements are filled with zero; Diagonal (P) is a diagonal matrix of size P×P with diagonal elements (i, i) filled with $M_i$ and other elements are filled with zero. Therefore, vertices VR of the graph include the computational resources that have referenced the relations and also machines MNR, which do not reference any relations.

For example, the relation $R_1$ has a copy at $M_1$, and the relation $R_2$ has two copies, one at $M_1$ and another at $M_2$, then $CR_1$ is represented as (1, 0), $CR_2$ is (1, 1), i.e.

$$CR = \begin{pmatrix} 1 & 0 \\ 1 & 1 \end{pmatrix}$$

As $R = \{R_1, R_2\}$, $\text{Diagonal}(R) = \begin{pmatrix} R_1 & 0 \\ 0 & R_2 \end{pmatrix}$ As $M = \{M_1, M_2\}$, $\text{Diagonal}(M) = \begin{pmatrix} M_1 & 0 \\ 0 & M_2 \end{pmatrix}$ Diagonal (R)×CR×Diagonal (M) operation will give the output for the example above as $\{R_1M_1, R_2M_1, R_2M_2\}$;
(b) the vertices are connected by edges $E=\{(u, v) \in V | u \neq v\hat{}$ if $u \in VR_R$ then $v \in VR_R\}$. The construction of edges, in accordance with the rule (b), prevents unnecessary connections between the copies of the same relation, since only one of the copies of the relation is used for query processing.

The query processing at a computational resource involves accessing and joining the relations. Each of these operations results in a processing cost. At step 202, a local processing cost for a relation at a computational resource is calculated. The local processing cost at the computational resource is defined as the cost of accessing the relation at the computational resource. A computational resource may maintain more than one access paths to access the relation R. The local processing cost is calculated as the minimum of all the available access path type costs $APC_{JRAZ}$ of an attribute 'a', and the relation 'R' for the access path type Z. Further, the local processing cost accounts for the access paths of one or more attributes of the relation R. Furthermore, the effect of processing speed on local processing is observed. Mathematically, the local processing cost at a computational resource 'i' is calculated as:

$$LPC_1 = \text{Min}_{\forall a \in A_r \wedge \forall q \in AP_{ira}} (APC_{iraz}) \times (1/PS_i) \times (1/Z_i) \quad (4)$$

where $PS_i$ is the processing speed at the computational resource 'i' in kilo bytes per second, and $Z_i=1$, if the number of machines that host the relation R is 1,
$Z_i=(AM_i-RM_i)$, if $AM_i > RM_i$, where $AM_i$=available memory at the computational resource 'i', and $RM_i$=required memory for the processing of the relation R at the computational resource 'i'
else $Z_i=0$.

Therefore, when the available memory is less than the required memory, the cost will be high. Further, $RM_i$ is calculated by using any statistical methods known in the art.

After calculating the local processing cost, a join processing cost for the relation is calculated at step 204. The join processing cost is defined as the total cost of joining a first relation with a second relation. Join processing involves selecting a minimum cost access path plan across the available set of join algorithm types and the access paths of attributes. Since one or more join operations can be performed at a particular node, the total cost of join processing is a sum of the cost of processing the one or more join operations.

$$JPC_i = \Sigma_{\forall rd}(JPC_{ird}) \times (1/PS_i) \times (1/Z_i) \quad (5)$$

where $JPC_{ird}$ is the join processing cost of joining a first relation $R_r$ and a second relation $R_d$ at a computational resource 'i', $PS_i$ is the processing speed at the computational resource 'i' in kilo bytes per second, and $Z_i=1$, if the number of machines that host the relation R is 1;

$Z_i=(AM_i-RM_i)$ if $AM_i > RM_i$, else $Z_i=0$.

Since the information freshness index of a copy of relation varies across the plurality of the computational resources that host the copies of the relations, the processing cost is weighed by incorporating a factor ($DF/IF_j$). This factor is a variation between the user-defined data freshness and the information freshness measure. Thereafter, at step 206, a processing cost is calculated, based on the local processing cost and the join processing cost. In an embodiment, the processing cost at a computational resource is defined as a sum of the local processing cost and the join processing cost. Mathematically, the processing cost is calculated as:

$$PC_i=(LPC_i+JPC_i) \times (DF/IF_i) \quad (6)$$

where DF is the user-defined freshness criterion entered by the user, and $IF_i$ is the information freshness measure that is calculated in accordance with equation (2).

After calculating the processing cost, a data transmission cost is calculated for the relation at step 208. The data transmission cost is the cost of transferring the relations from a first to a second computational resource. The data transmission cost is defined as the product of bytes transmitted and the cost of communication from the first to the second computational resource.

$$DTC_{ij}=(D_{ij} \times CC_{ij}) \quad (7)$$

where $DTC_{ij}$ is the cost of data transmission from the first computational resource, such as 'i', to the second computational resource, such as 'j', and $D_{ij}$ is the amount of data transferred from the first computational resource, such as 'i', to the second computational resource, such as 'j'. In an embodiment, $D_{ij}$ for transmitting a relation to the computational resource 'j' can be calculated as:

$$D_{ij}=SR_r \times \Pi_{p \in AL_r} SEL_p \quad (8a)$$

where $SR_r$ is the size of the relation R, $AL_r$ is the size of the referenced local attributes in the query Q for the relation R, and $SEL_p$ is the selectivity of predicate p. Alternatively, to transmit the two joined relations, $R_r$ and $R_d$, to the computational resource 'j', $D_{ij}$ can be calculated as:

$$D_{ij}=SR_r \times SR_d \times SEL_p \quad (8b)$$

$CC_{ij}$ is the communication cost for the link between the first computational resource, such as 'i', and the second computational resource, such as 'j'.

The data to be transferred is estimated, based on the size of the relations processed at the first computational resource 'i'.

At step 210, it is determined whether the local and join processing costs have been calculated for all the relations in a processing route. If not, Step 202 to step 208 are repeated for each of the one or more relations in the processing route.

A solution graph S is constructed to represent the integrated cost model. The details related to the construction of sub-paths and the solution graph S are explained in conjunction with FIG. 3. Further, at step 212, for each of the one or more solutions from the solution graph S, an objective function Obj (S) is calculated. This function denotes the maximum cost among the available sub-paths in the solution graph S. The cost of each of the sub-paths is calculated as the sum of processing costs of the one or more copies of the relations at each of the computational resource and data transmission cost for the transfer of the one or more copies of the relations from the first to the second computational resource.

Figure 3:
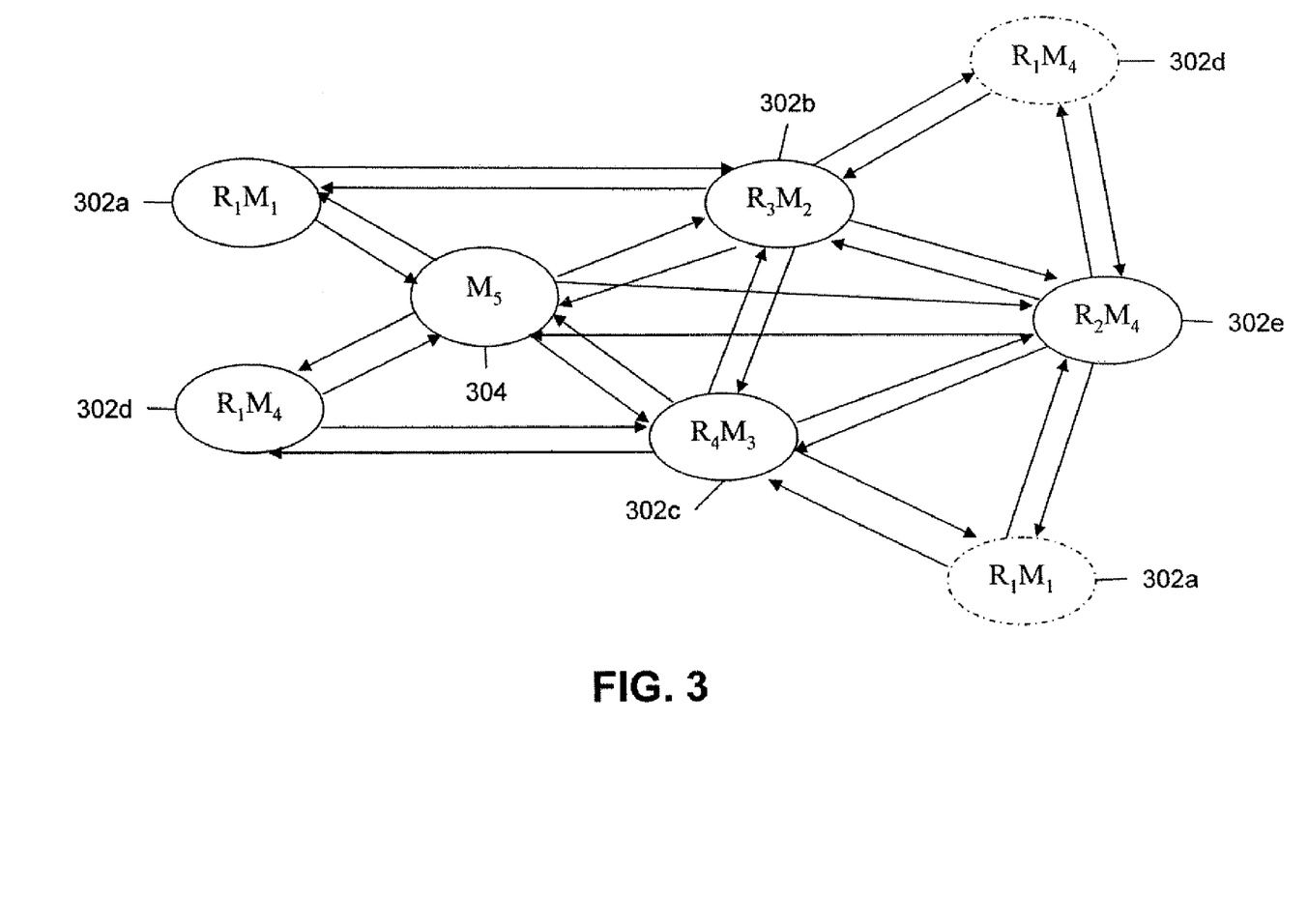
FIG. 3 is a sample graph of the integrated cost model for a distributed query, in accordance with an embodiment of the invention.

FIG. 3 is a sample graph for the integrated cost model for a distributed query, in accordance with an embodiment of the invention. This graph includes one or more computational resources 302a, 302b, 302c, 302d, 302e, and 304. Computational resource 302a is denoted as $M_1$ that hosts the relation $R_1$. Computational resource 302b is denoted as $M_2$ that hosts the relation $R_2$. Computational resource 302c is denoted as $M_3$ that hosts the relation $R_3$. Computational resource 302d is denoted as $M_4$ that hosts the relation $R_1$. Computational resource 302e is denoted as $M_4$ that hosts the relation $R_2$. Computational resource 304 is denoted as $M_5$ that hosts no relation.

Let M={MRR}U{MNR}, where MRR are one or more computational resources from the plurality of computational resources M that host the copies of the relation R, and MNR are one or more computational resources from the plurality of computational resources M that do not host one or copies of the relation R. Moreover, each computational resource maintains a record NN of one or more nearest computational resources. The record NN is used to transfer the computational tasks to other computational resources in the network for an enhanced query response time. The record NN is based on the available memory $AM_i$ and the processing speed $PS_i$ of each of the computer resource i.

For example, for a query $Q_1=\{R_1.a, R_4.c | R_1.a=R_2.a\hat{} R_2.b=R_3.b\hat{} R_3.c=R_4.c\}$, let M={$M_1, M_2, M_3, M_4$} and copies of the relations $CR_1$={1, 0, 0, 1, 0}, $CR_2$={0, 0, 0, 1, 0}, $CR_3$={0, 1, 0, 0, 0}, and $CR_4$={0, 0, 1, 0, 0}. In accordance with the definition of MRR and MNR, MRR={$M_1, M_2, M_3, M_4$} and MNR={$M_5$} for the query $Q_1$. Therefore, vertices V can be represented as V={VR}+{MNR}, where VR for the given query is given as Diagonal (R)×CR×Diagonal (M)={$R_1M_1$, $R_1M_4$, $R_2M_4$, $R_3M_2$, $R_4M_3$}. Hence, V={$R_1M_1$, $R_1M_4$, $R_2M_4$, $R_3M_2$, $R_4M_3$, $M_5$}.

In an embodiment of the present invention, the objective function Obj (S) is calculated as:

$$Obj(S) = Max_{\forall j \in SP} PC_i + \Sigma_{\forall (i,j) \in SP} DTC_{ij}) \quad (10)$$

It can be observed that the sample graph illustrates that no edge is connected between $R_1M_1$ and $R_1M_4$, such that the relation $R_1$ is not accessed more than once.

Figure 4A:
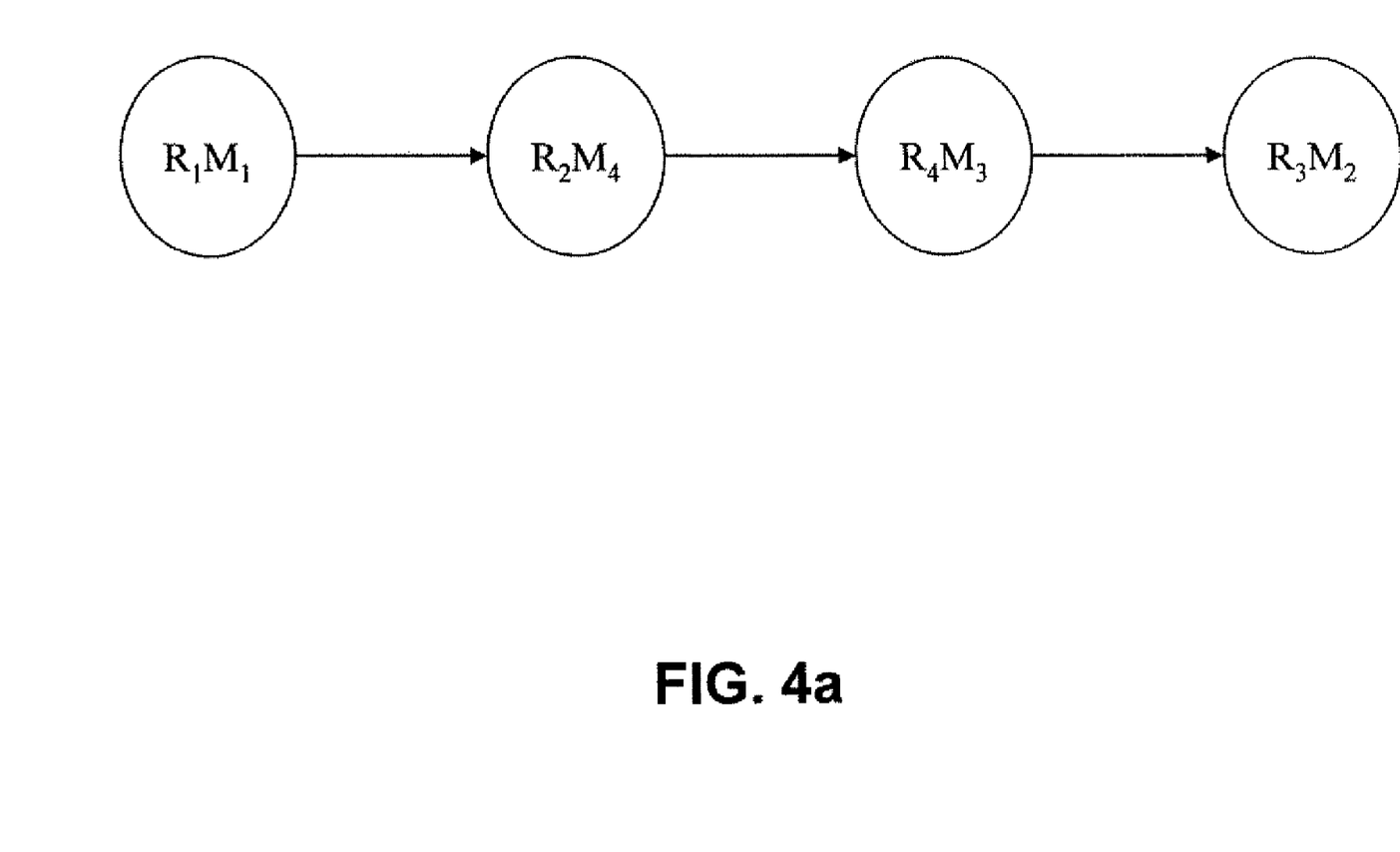
FIGS. 4a, 4b and 4c is a sample solution for the integrated cost model for the distributed query, in accordance with an embodiment of the invention.
Figure 4B:
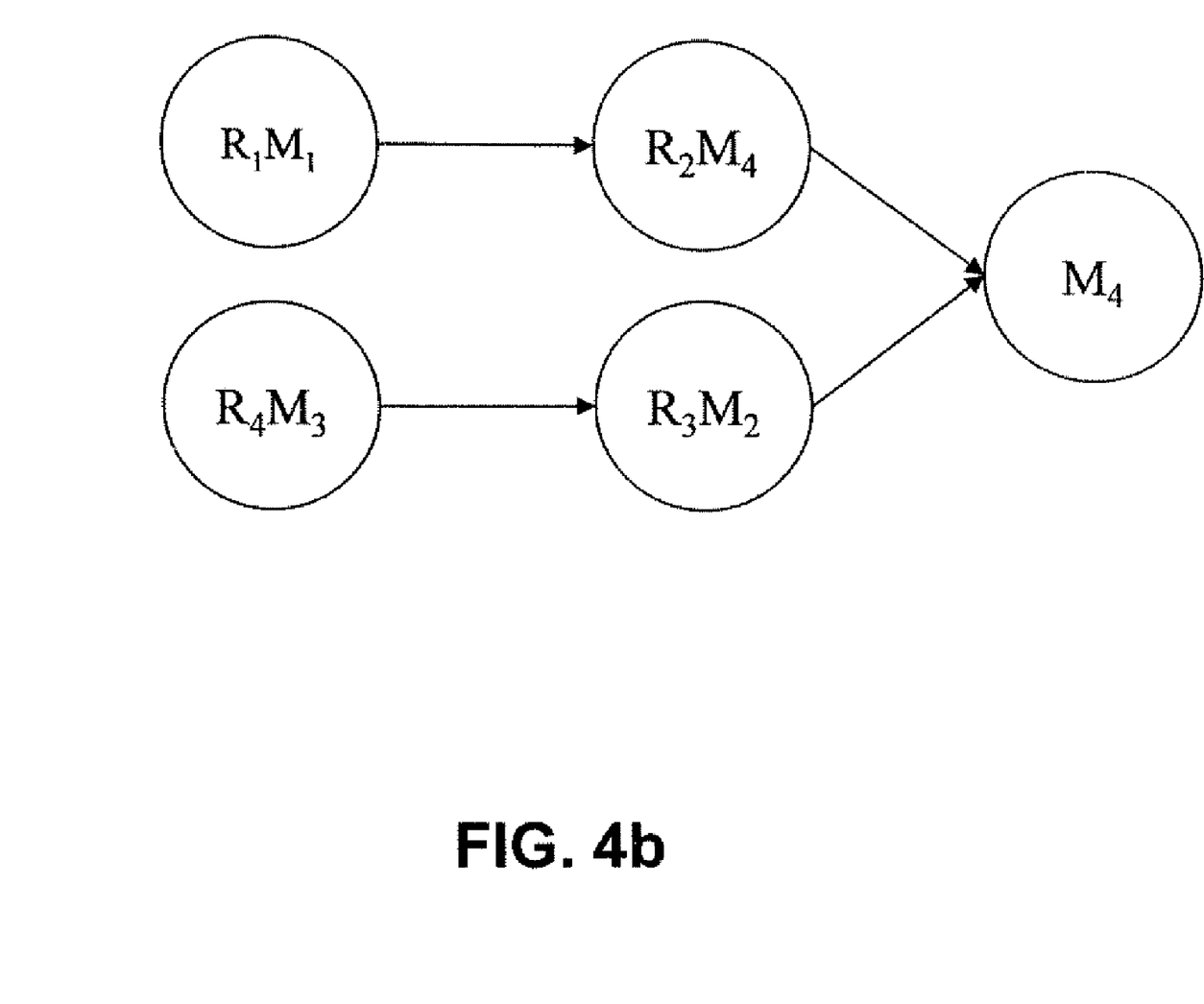
Figure 4C:
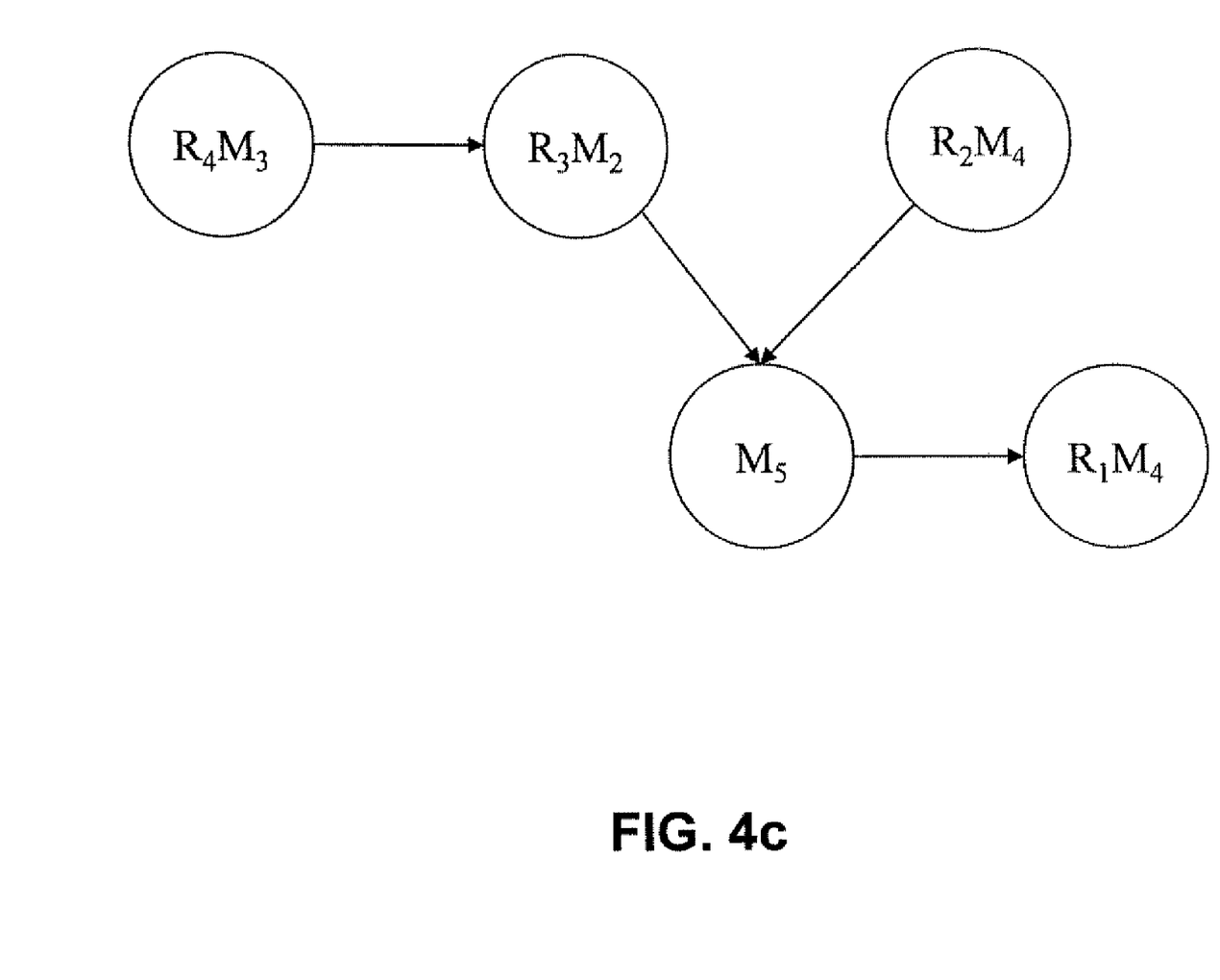

FIGS. 4a, 4b and 4c depict sample solutions for the integrated cost model for the distributed query, in accordance with an embodiment of the invention. FIG. 4a illustrates an initial solution of processing route $R_1M_1$, $R_2M_4$, $R_4M_3$, and $R_3M_2$, such that at least one relation referenced in the query $Q_1$ is processed for the execution of the query $Q_1$. Thereafter, the solution is refined by using a plurality of heuristic approaches for the generation of an optimal solution of the integrated cost model for iterative results. The heuristic approaches are used until no further improvements in the objective functions can be obtained.

In accordance with equation (10), the objective function Obj (S) for the solution is calculated as:

$$Obj(S) = PC_1 + PC_2 + PC_3 + PC_4 + DT_{12} + DT_{23} + DT_{34} \quad (11)$$

where $PC_1$ is the local processing cost at the vertex $V_1$, i.e., the cost of local processing of the relation $R_1$ at the computational resource $M_1$. Similarly, $DT_{12}$ is the cost of transfer of processed the relation $R_1$ from vertex $V_1$ to vertex $V_2$, i.e., the cost of transfer of relation from the computational resource $M_1$ to $M_4$. $PC_2$ is the cost of processing at vertex $V_2$, i.e., the cost of joining relations $R_1$ and $R_2$ at the computational resource $M_4$. FIGS. 4b and 4c depict alternate solutions. The details of these alternate solutions are explained in conjunction with the description of FIG. 5.

Figure 5:
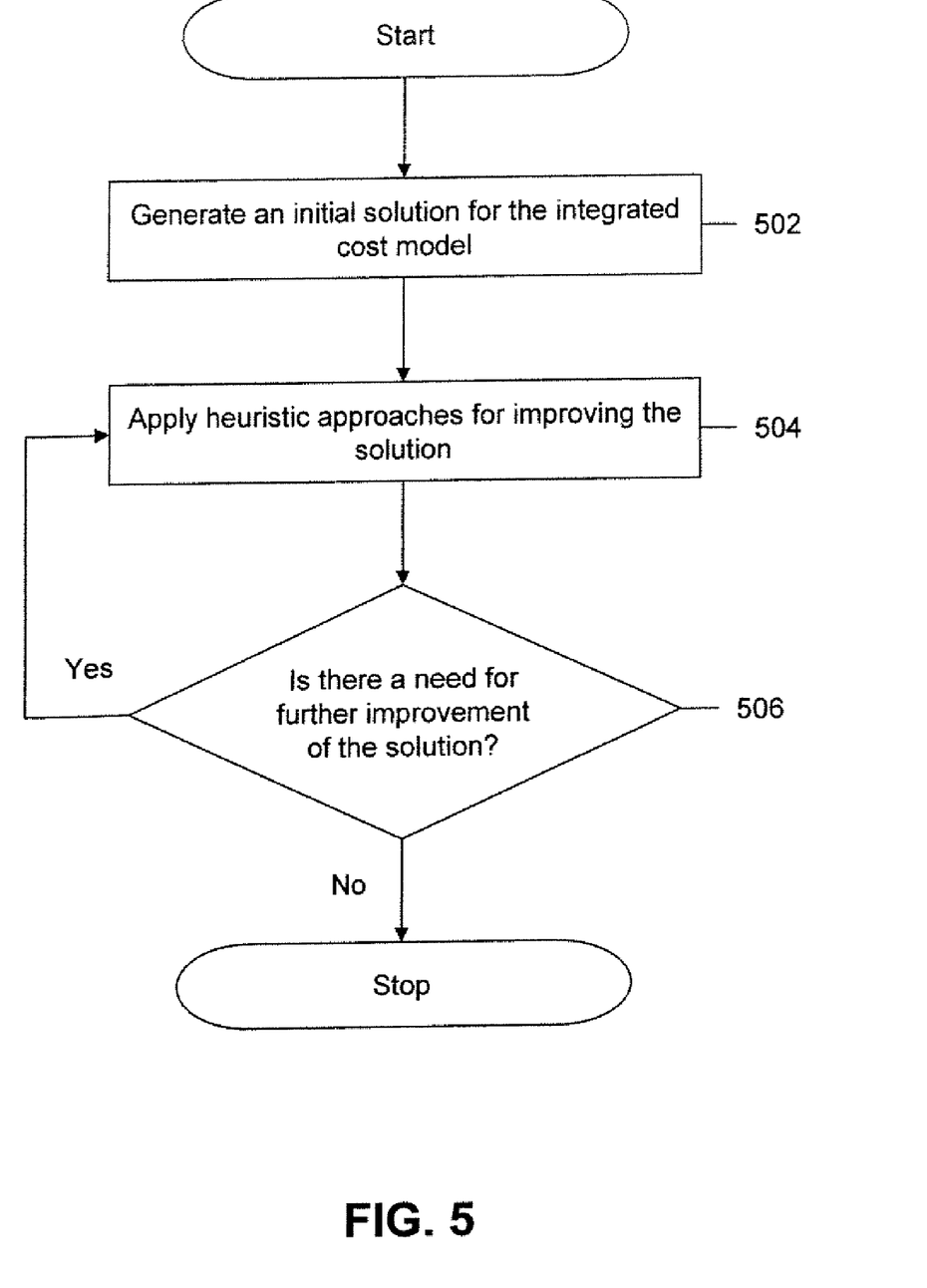
FIG. 5 is a flowchart illustrating a method for determining an optimal solution for the integrated cost model, in accordance with an embodiment of the invention.

FIG. 5 is a flowchart illustrating a method for determining an optimal solution for the integrated cost model, in accordance with an embodiment of the invention. Amongst alternate solutions for graph G, a solution with the minimum overall cost for query evaluation/execution is determined. This query execution solution comprises a join ordering plan, a copy identification plan, a parallel execution plan, and a fast parallel execution plan.

At step 502, an initial solution for the integrated cost model is generated. In an embodiment of the invention, to generate the initial solution, a join ordering plan is identified by ordering the relations referenced in the distributed query in an ascending order for join processing. Further, the relations may be ordered in ascending order of the sizes of the relations, such that the relation that has the largest size is processed in the end. At first, smaller relations are joined so that the amount of data communicated/processed at subsequent stages is minimized. Then, one or more copies of the relations are selected, based on one or more integrated cost model factors. In an embodiment, the copies are selected, based on the processing speed PS of the computational resources that host the copies of the relations. The heuristic procedure is applied iteratively to refine the solution and provide a better query response time. The iterations aim at reducing the value of the objective function. The lower value of the objective function ensures lower cost of processing and hence faster query response time.

Once the initial solution of the integrated cost model has been generated, various heuristic approaches are applied to improve the initial solution, at step 504. Various other heuristic approaches are applied to solve the integrated cost model as known in the art of a travelling salesman problem (TSP) known in the art. In an embodiment of the invention, one of the heuristic approaches applied include iterative improvement heuristics, computational node heuristics, and parallel plan heuristics. Further, a node improvement heuristics may be used that includes the exchange of one or more vertices in one or more ways. The node improvement heuristics includes a neighboring node exchange heuristics that improves the solution by enabling the exchange of any two vertices in the solution. For example, a solution of the processing route $V_1, V_2, V_3, V_4, V_5$, and $V_6$ can be transformed to the processing route $V_1, V_2, V_4, V_3, V_5$, and $V_6$ by exchanging the vertices $V_3$ and $V_4$. However, as in a TSP, exchange of all vertices may not be possible. For example, exchanging $V_2$ and $V_3$ to form a solution of the processing route $V_1, V_3, V_2, V_4, V_5$, and $V_6$ may lead to the generation of a Cartesian product for the join operation performed between one or more relations in vertex $V_1$ and vertex node $V_3$, or between relations in vertices $V_2$ and $V_4$, which may have high processing cost. Further, a vertex exchange may be performed between the computational resources hosting more than one copy of the relation. For example, the processing route $R_1M_1$, $R_2M_4$, $R_4M_3$, and $R_3M_2$ illustrated in FIG. 4a can be transformed into $R_1M_1$, $R_2M_2$, $R_4M_3$, and $R_3M_2$, if more than one copy of the relation $R_2$ hosted by the computational resources $M_2$, $M_7$, $M_{10}$, $M_5$, $M_{11}$, $M_4$, and $M_2$ are nearest to $M_1$ and/or $M_3$.

Furthermore, above heuristic approaches do not consider parallel execution of the distributed query. A parallel plan construction heuristic is used to identify the options for parallel execution for fast query evaluation. For example, the solution illustrated in FIG. 4b shows the solutions by using the parallel plan heuristics. FIG. 4a of the processing route $R_1M_1$, $R_2M_4$, $R_4M_3$, and $R_3M_2$ can be split in the middle and each of the sub-paths can be executed in parallel. Subsequently, $R_1M_1$, $R_2M_4$ and $R_4M_3$, $R_3M_2$ can be executed in parallel and the results are combined at the computational resource $M_4$. However, if the size of the solution processing route is long, the number of parallel plans that needs to be evaluated is high. A novel heuristic approach is used to limit the total number of parallel plans evaluated.

In an embodiment of the invention, to limit the total number of combinations evaluated, the processing route is dissected at an edge, which has a succeeding edge with higher normalized data transmission costs than its own. The normalized data transmission cost is defined as the ratio of the data transmission cost and the edge communication cost. The succeeding edge incurs a high normalized data transmission cost due to low selectivity of the join operation at the intermediate node. This heuristic approach enables parallelizing the plan along with prioritizing the least selective join operation for a later execution along the path. Multiple parallel plans can be generated from the solution, since there could be more than one set of edges that satisfy the cost criterion above. Therefore, the heuristic helps to filter profitable parallel plans from an exhaustive enumeration and evaluation of all possible parallel plans.

In another embodiment of the invention, a fast parallel plan is identified by using a computational node heuristic. This computational node heuristic utilizes the computational resources that do not host the relations referenced in the query for fast parallel query evaluation. The computational node heuristic is used when the estimated amount of memory required to process at a computational resource exceeds its available memory. For example, as illustrated in FIG. 4c, a query that has an initial solution processing route $R_1M_1$, $R_2M_4$, $R_4M_3$, and $R_3M_2$ may be iteratively transformed by using the one or more of the heuristics above to $R_4M_3$, $R_3M_2$, $R_2M_4$, and $R_1M_4$. Further, it may be assumed that the amount of memory required to process the combined results of $R_4$ and $R_3$ is more than the available memory at vertex $R_2M_4$. This may result in multiple I/O operations and slow down the query performance. Therefore, another heuristic procedure is used to introduce the computational resources MNR that do not host referenced relations. If MNR is greater than one, a computational resource is selected, based on the record NN.

Finally, at step 506, it is determined if there is a need for further improvement in the solution. If further improvement is needed, at step 504, various heuristic approaches are applied. In an embodiment of the invention, the need for further improvement is assessed, based on the improvement in the objective function value in the current iteration, in comparison with the previous iteration. In another embodiment of the invention, heuristic approaches may also be employed for a pre-defined period.

The invention described above provides an integrated cost model that includes computational-resource and database-related parameters. Further, the invention provides the query execution results, based on a user-defined freshness criterion. This criterion helps to provide the version of the distributed query results desired by the user, and enables the realization of an enhanced query response time.

Moreover, the integrated cost model provides an enhanced query response time by using the computational resources that do not host relations.

In various embodiments of the invention, the method for processing a distributed query may be implemented in the form of software, hardware, firmware, or combinations thereof.

The computer system comprises a computer, an input device, a display unit, and the Internet. The computer also comprises a microprocessor, which is connected to a communication bus. It also includes a memory, which may be Random Access Memory (RAM) or Read Only Memory (ROM). Further, the computer system comprises a storage device, which can be a hard disk drive or a removable storage drive, such as a floppy disk drive, an optical disk drive, etc. The storage device can also be other similar means of loading computer programs or other instructions into the computer system. The computer system includes a communication unit, which enables it to connect to other databases and the Internet through an I/O interface. The communication unit enables transfer and reception of data from other databases. This communication unit may include a modem, an Ethernet card or any similar device that enables the computer system to connect to databases and networks, such as LAN, MAN, WAN, and the Internet. The computer system facilitates inputs from a user through an input device that is accessible to the system through an I/O interface.

The computer system executes a set of instructions that is stored in one or more storage elements to process input data. These storage elements may hold data or other information, as desired, and may be in the form of an information source or a physical memory element that is present in the processing machine.

The set of instructions may include various commands that instruct the processing machine to perform specific tasks, such as the steps that constitute the method of the present invention. This set of instructions may be in the form of a software program. Further, the software may be in the form of a collection of separate programs, a program module with a long program, or a portion of a program module, as in the present invention. The software may also include modular programming in the form of object-oriented programming. Processing of input data by the processing machine may be in response to the users' commands, the results of previous processing, or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

The invention claimed is:

1. A method for reducing query response time for processing a distributed query in a network of a plurality of computational resources, wherein at least one of the plurality of computational resources hosts one or more relations, the one or more relations belonging to one or more databases, the one or more relations being replicated using a lazy replication technique to form one or more copies of the one or more relations, the method comprising:
 a. receiving a user-defined data freshness criterion, wherein the user-defined data freshness criterion indicates a version of data desired by a user in the distributed query processing results;
 b. determining from among an available set of distributed query processing solutions, a solution with the minimum overall cost for query execution, the determination comprising applying an integrated cost model to each available query processing solution and thereafter selecting the solution with the lowest overall cost, wherein the integrated cost model is based on at least the following cost model factors:
  i. an information freshness measure of the one or more relations, the information freshness measure being based on the version of the one or more copies of the one or more relations across the plurality of computational resources;
  ii. one or more computational resource parameters, the one or more computational resource parameters comprising available memory of each of the plurality of computational resources and processing speed of each of the plurality of the computational resources;
  iii. one or more database related parameters, the one or more database related parameters comprising one or more index access paths, one or more join algorithm types, size of one or more copies of the one or more relations, and selectivity of one or more local and join predicates; and iv. one or more cost parameters, the one or more cost parameters comprising communication cost for a link between a first computational resource and a second computational resource.

2. The method according to claim 1, wherein the lazy replication technique enables periodic updating of the one or more relations in the plurality of computational resources.

3. The method according to claim 1, wherein applying the integrated cost model to a query processing solution comprises construction of an objective function, wherein the objective function is based on a processing cost for each of the one or more copies of the one or more relations and a data transmission cost for transfer of the one or more copies of the one or more relations from the first computational resource and the second computational resource.

4. The method according to claim 3, wherein the processing cost is calculated based on a join processing cost and a local processing cost at each of the plurality of computational resources.

5. The method according to claim 4, wherein the join processing cost and the local processing cost are calculated based on the cost model factors.

6. The method according to claim 3, wherein the data transmission cost is calculated based on the cost model factors.

7. The method according to claim 1 wherein selecting the solution with the lowest overall cost comprises evaluation of one or more heuristic approaches, the one or more heuristic approaches comprising one or more parallel plan construction heuristics approaches and one or more computational node heuristic approaches.

8. The method according to claim 7, wherein selecting the solution with the lowest overall cost further comprises:
  a. identifying a join ordering plan from one or more join ordering plans generated by the one or more heuristics approaches, the identification being based on the integrated cost model factors;
  b. selecting a copy from the one or more copies of the one or more relations based on the one or more integrated cost model factors;
  c. determining a parallel plan using the plurality of computational resources hosting the one or more relations referenced in the distributed query; and
  d. identifying a fast parallel execution plan for selecting one or more of the plurality of computational resources that host zero copies of the one or more relations referenced in the distributed query.

9. The method according to claim 1, wherein the integrated cost model is additionally based on at least one of the following cost model factors:
  i. the user defined data freshness criterion; and
  ii. the plurality of computational resources.

10. A computer program product comprising a non-transitory computer usable medium having computer readable program code embodied therein for reducing query response time for processing a distributed query in a network of a plurality of computational resources, wherein at least one or more of the plurality of computational resources host one or more relations, the one or more relations belonging to one or more databases, the one or more relations being replicated using a lazy replication technique to form one or more copies of the one or more relations, the computer readable program code adapted to:
  a. receive a user-defined data freshness criterion, wherein the user-defined data freshness criterion indicates a version of data desired by a user in the distributed query processing results;
  b. determine from among an available set of distributed query processing solutions, a solution with the minimum overall cost for query execution, the determination comprising applying an integrated cost model to each available query processing solution and thereafter selecting the solution with the lowest overall cost, wherein the integrated cost model is based on at least the following cost model factors:
    i. an information freshness measure of the one or more relations, the information freshness measure being based on the version of the one or more copies of the one or more relations across the plurality of computational resources;
    ii. one or more computational resource parameters, the one or more computational resource parameters comprising available memory of each of the plurality of computational resources and processing speed of each of the plurality of computational resources;
    iii. or more database related parameters, the one or more database related parameters comprising one or more index access paths, one or more join algorithm types, size of one or more copies of the one or more relations, and selectivity of one or more local and join predicates; and
    iv. one or more cost parameters, the one or more cost parameters comprising communication cost for a link between a first computational resource and a second computational resource.

11. The computer program product according to claim 10, wherein the computer readable program code adapted to apply the integrated cost model to a query processing solution comprises instructions for construction of an objective function, the objective function is based on a processing cost for each of the one or more copies and a data transmission cost for transfer of one or more relations from the first computational resource and the second computational resource.

12. The computer program product according to claim 10 further comprising computer readable program code adapted to select the solution with the lowest overall cost comprises instructions for evaluation of one or more heuristic approaches, the one or more heuristic approaches include one or more parallel plan construction heuristics approaches and one or more computational node heuristic approaches.

13. The computer program product according to claim 12, wherein the computer readable program code adapted to select the solution with the lowest overall cost further comprises:
  a. instructions for identifying a join ordering plan from one or more join ordering plans generated by the one or more heuristics approaches, the identification being based on the one or more integrated cost model factors;
  b. instructions for selecting a copy from the one or more copies of the one or more relations based on the one or more integrated cost model factors;
  c. instructions for determining a parallel plan using the plurality of computational resources that host one or more relations referenced in the distributed query; and
  d. instructions for identifying a fast parallel execution plan for selecting one or more of the plurality of computational resources that host zero copies of the one or more relations referenced in the distributed query.

14. The computer program product according to claim 10, wherein the integrated cost model is additionally based on at least one of the following cost model factors:
  i. the user defined data freshness criterion; and
  ii. the plurality of computational resources.

* * * * *

UNITED STATES PATENT AND TRADEMARK OFFICE
CERTIFICATE OF CORRECTION

PATENT NO. : 8,103,656 B2
APPLICATION NO. : 12/389473
DATED : January 24, 2012
INVENTOR(S) : Srikumar Krishnamoorthy, Avdhoot Kishore Saple and Prahalad Haldhoderi Achutharao It is certified that error appears in the above-identified patent and that said Letters Patent is hereby corrected as shown below:

In the Claims

Column 12, line 18, Claim 10, after "iii." insert --one--.

Signed and Sealed this
Fourteenth Day of May, 2013

Teresa Stanek Rea
*Acting Director of the United States Patent and Trademark Office*